United States Patent [19]

Ransom et al.

[11] Patent Number: 5,083,363
[45] Date of Patent: Jan. 28, 1992

[54] METHOD OF INSTALLING A GROMMET IN A WALL OF COMPOSITE MATERIAL

[75] Inventors: Joy Sarah Ransom, Seattle; Eric T. Easterbrook, Kent; Roger T. Bolstad, Seattle; Michael A. Landy, Bellevue; Charles M. Copple, Kent; Leonard F. Reid, Bellevue, all of Wash.

[73] Assignee: Fatigue Technology, Inc., Seattle, Wash.

[21] Appl. No.: 558,336

[22] Filed: Jul. 25, 1990

[51] Int. Cl.$^5$ ............................................. B21D 39/04
[52] U.S. Cl. ...................................... 29/523; 29/272; 29/280; 29/282; 72/393
[58] Field of Search ............... 29/272, 280, 282, 446, 29/523, 507; 72/370, 393; 225/175; 403/104, 408.1; 411/501, 43, 339

[56] References Cited

U.S. PATENT DOCUMENTS

| | | | |
|---|---|---|---|
| 1,302,324 | 4/1919 | Devlin . | |
| 1,610,796 | 12/1926 | King | 29/523 |
| 2,185,483 | 1/1940 | Ward . | |
| 2,360,054 | 10/1944 | Haas . | |
| 2,409,180 | 10/1946 | Annett et al. . | |
| 2,687,763 | 8/1954 | Perkins . | |
| 3,538,792 | 11/1970 | Stillwagon, Jr. . | |
| 3,566,662 | 3/1971 | Champoux | 72/370 |
| 3,943,748 | 3/1976 | King, Jr. | 72/393 |
| 4,113,006 | 9/1978 | Clapp . | |
| 4,164,807 | 8/1979 | King, Jr. | 29/523 |
| 4,320,568 | 3/1982 | Herrod et al. . | |
| 4,405,256 | 9/1983 | King, Jr. | 403/408.1 |
| 4,405,273 | 9/1983 | Ruhl et al. | 411/43 |
| 4,425,780 | 1/1984 | Champoux | 72/370 |
| 4,432,679 | 2/1984 | Angelosanto et al. . | |
| 4,437,805 | 3/1984 | Smith | 411/361 |
| 4,473,914 | 10/1983 | Haft . | |
| 4,481,702 | 11/1984 | Mitchell . | |
| 4,581,817 | 4/1986 | Kelly . | |
| 4,609,317 | 9/1986 | Dixon et al. | 411/339 |
| 4,615,655 | 10/1986 | Dixon | 411/339 |
| 4,702,655 | 10/1987 | Kendall | 411/43 |
| 4,755,904 | 7/1988 | Brick . | |
| 4,844,673 | 7/1989 | Kendall . | |
| 4,846,611 | 7/1989 | Sadri et al. | 411/43 |
| 4,934,038 | 6/1990 | Caudill | 29/523 |

Primary Examiner—Joseph M. Gorski
Assistant Examiner—Peter Dungba Vo
Attorney, Agent, or Firm—Delbert J. Barnard

[57] ABSTRACT

The present invention provides a method of installing a grommet within an opening in a wall of composite material. An opening (10) is formed in a wall of composite material (12). A countersink (20) is formed at one end of the opening (10). A grommet (22) is placed into the opening (10). A split sleeve (28) is placed on the small diameter portion (30) of a mandrel (32) which is attached to a power puller (36). The mandrel (32) with the split sleeve (28) is placed through the opening (10) and a grommet (22). The power puller (36) is then operated to pull the mandrel (32) back through the opening (10) and the grommet (22) thereby expanding the split sleeve (28) which in turn provides for the radial expansion of the grommet (22). During the radial expansion of the grommet (22), ends of fibers (16) are forced into the surface of the grommet (24). After the mandrel (32) has been pulled all the way through the split sleeve (28) both it and the split sleeve (28) are removed from the grommet (22). This leaves the grommet (22) securely fastened within the opening (10) in the composite wall (12).

17 Claims, 3 Drawing Sheets

5,083,363

METHOD OF INSTALLING A GROMMET IN A WALL OF COMPOSITE MATERIAL

DESCRIPTION

1. Technical Field

The present invention relates to a method of installing a grommet within an opening in a wall of composite material. More particularly, it relates to the use of split sleeve expansion for firmly securing a grommet within an opening in the wall of composite material.

2. Background Information

Composite materials are being used in place of metals in the construction of aircraft and other structures. As is well known to persons skilled in the art, a "composite" material comprises layers of a structural fabric within a resin matrix. The fabric is woven threads of strong fibers. It is known to install grommets within openings in the composite material provided to receive fasteners or pass tubing, wires, etc. A problem with the use of grommets is that they don't always stay in place. Gluing has been tried and is not entirely satisfactory. Also, it has been proposed to position a grommet within an opening and then expand the grommet by passing through it an expansion member which acts directly on the grommet. A problem with this procedure is that the expansion member acting directly against the grommet has been found to crush the composite material immediately surrounding the grommet, resulting in enlargement of the hole to the extent that the grommet will not stay in it. U.S. Pat. No. 4,755,904, granted July 5, 1988, to Rowan Brick, discloses the use of expansion bolts for expanding the grommets. U.S. Pat. No. 4,405,256, granted Sept. 20, 1983, to John O. King, Jr., discloses the use of a similar expansion bolt for expanding a grommet or a sleeve within openings in two walls of composite material which are to be connected together by the bolt. King provides his grommet with an outer layer of a cushion material.

The principal object of the present invention is to provide a method of installing a grommet into an opening in a wall of composite material which method is both fast and easy and which results in a very secure connection of the grommet to the composite material so that the grommet will not fall out of the opening. The grommet increases electrical bonding by eliminating air gaps, which in turn reduces problems associated with lightning strikes. In addition, the grommet prevents the ingress of water and may increase the strength around the hole.

Another object of the present invention is to provide for the radial expansion of a grommet with negligent axial movement of the grommet since any axial movement is absorbed by a split sleeve. In addition, the grommet reduces fatigue failure of a fastener passing therethrough. In the preferred embodiment, utilization of the countersunk increases surface area of the grommet.

DISCLOSURE OF THE INVENTION

The method of this invention is basically characterized by the following steps. A cylindrical opening is formed in a wall of composite material, to create a grommet-receiving opening cutting across the fibers of the material. A grommet is inserted into the opening. A one-piece split sleeve is placed onto a small diameter portion of a mandrel. The mandrel and split sleeve are then inserted into the grommet. Then, the split sleeve and grommet are held in a fixed axial position within the opening and the mandrel is moved axially through the split sleeve. The movement of the mandrel moves first an increasing diameter portion of the mandrel, and then a maximum diameter portion of the mandrel, axially through the split sleeve. The mandrel expands the split sleeve radially and the split sleeve imposes a radially outwardly directed force on the grommet, to expand the grommet within the opening. The mandrel and split sleeve are so sized that the radial expansion of the split sleeve exerts sufficient radial forces on the grommet to plastically expand the grommet and place the side wall of the opening into a tight gripping contact with the grommet without any significant crushing of the composite material bordering the opening. Following such expansion of the sleeve and grommet, the split sleeve is removed from the grommet and discarded.

In preferred form, the mandrel is moved through the split sleeve by pulling the mandrel. Preferably also, the mandrel is pulled by use of a power puller of a type having a nosepiece. The nosepiece is positioned against the wall and grommet while the mandrel is pulled through the split sleeve, which is held in place by a sleeve retainer adjacent to the nosepiece.

Preferably also, the radial expansion of the grommet is controlled so that the ends of the fibers in the composite material penetrate into the grommet.

In preferred form, hand force is used to insert the grommet in to the opening. Also, in preferred form, a countersink is formed in the wall, at one end of the cylindrical opening. A grommet is used which has a flared end portion which matches the countersink. The end portion of the grommet is moved into the countersink when the grommet is moved into the opening.

In preferred form, the mandrel has a maximum diameter portion that is less than the inside diameter of the grommet. The split sleeve, when on the small diameter of the mandrel, has an outside diameter which is less than the inside diameter of the grommet. As a result, the mandrel with the split sleeve in place on the small diameter portion can be inserted through the grommet and then pulled back from one side of the wall.

Other objects, advantages and features of the invention will be hereinafter described in connection with, or will be apparent from, the description of the preferred embodiment or best mode, the appended claims, and/or the annexed drawings.

BRIEF DESCRIPTION OF THE DRAWINGS

In the drawings, like element designations refer to like parts throughout the several views, and.

BEST MODE FOR CARRYING OUT THE INVENTION

Figure 1:
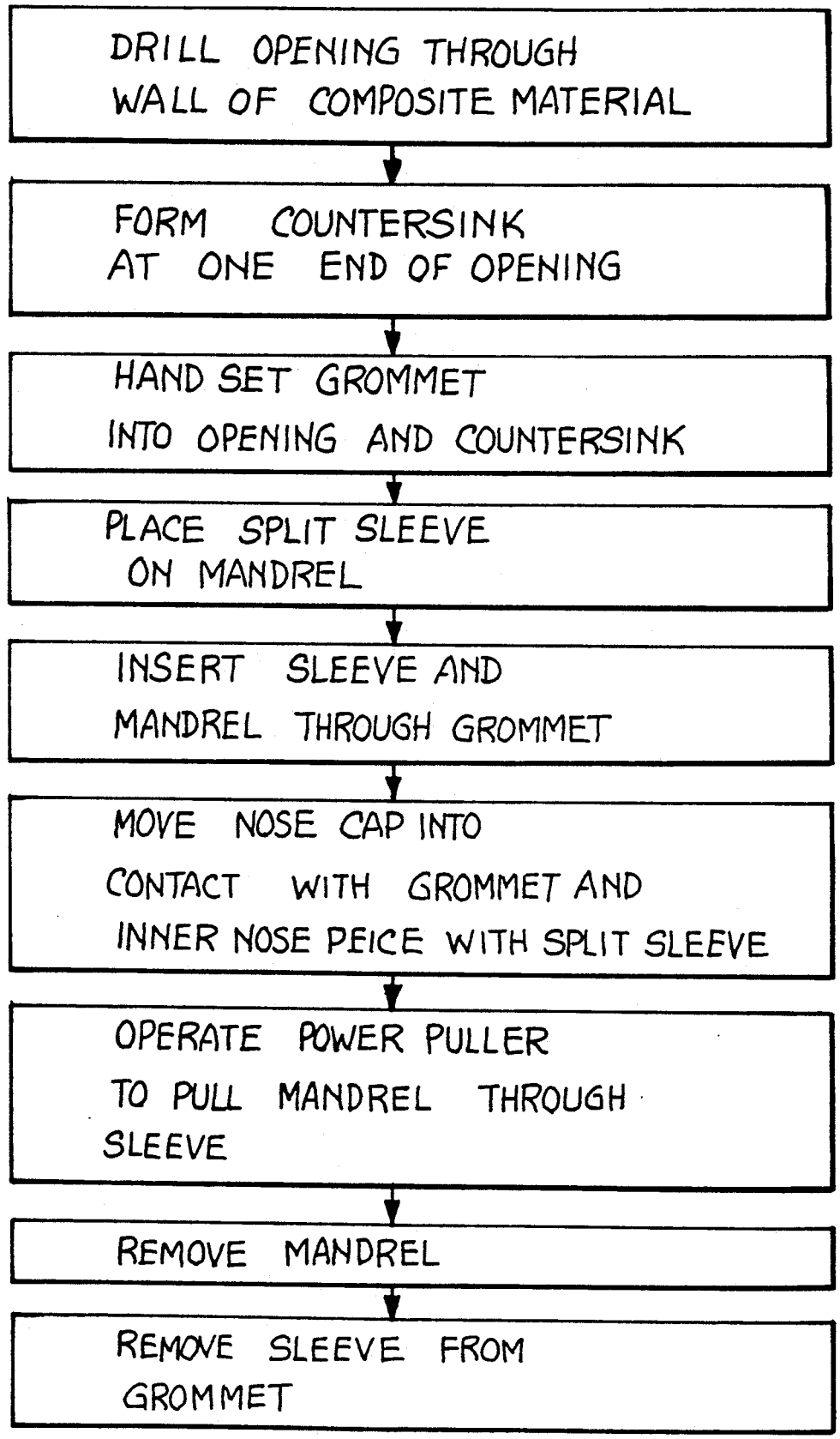
FIG. 1 is a diagram of the principal steps of the invention.
Figure 2:
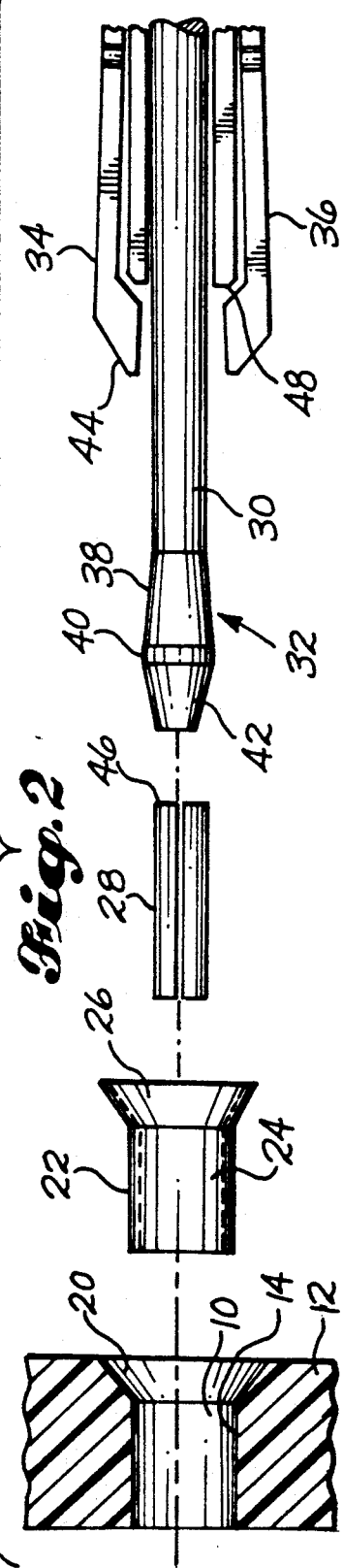
FIG. 2 is an exploded side elevational view of a wall including a countersunk hole into which a grommet is to be installed, the grommet, and the tooling for expanding the grommet to anchor it within the opening, including a mandrel, a split sleeve and a puller gun nosepiece, with some parts shown in section.
Figure 4:
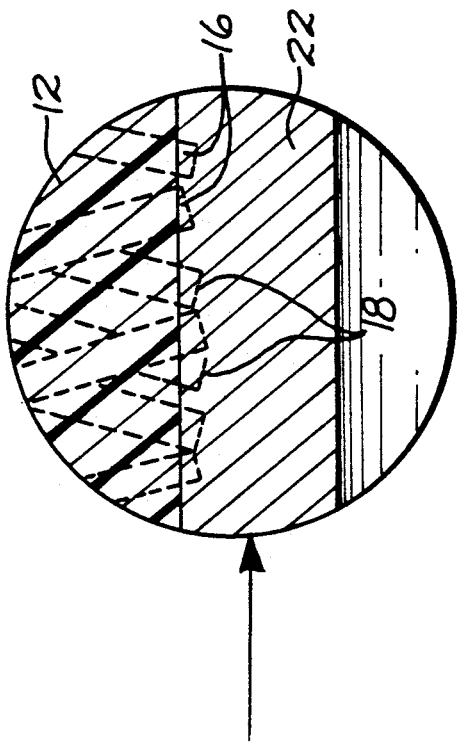
FIG. 4 is a fragmentary view on a further enlarged scale, taken in the vicinity of an outer surface portion of the grommet, showing the ends of fiber members within the composite material penetrating into the outer surface of the grommet.
Figure 3:
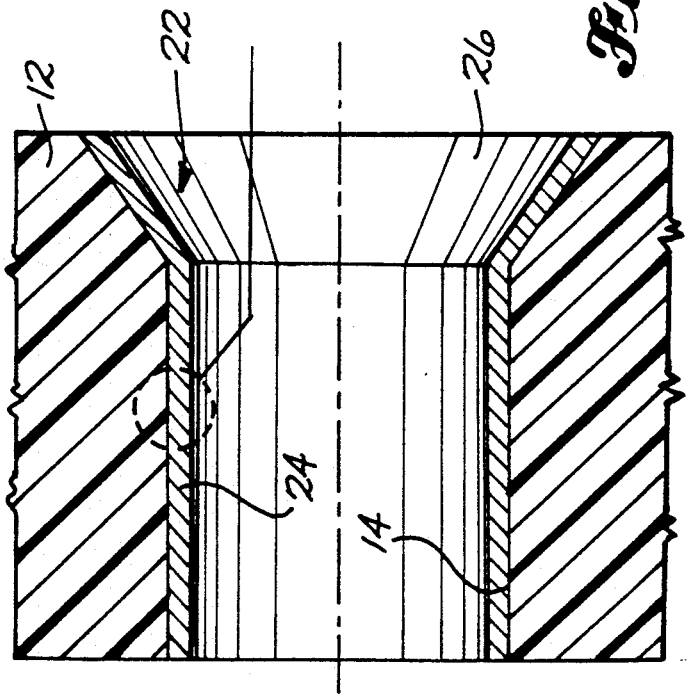
FIG. 3 is an enlarged scale fragmentary sectional view of a grommet installed in a wall of composite material.
Figure 5:
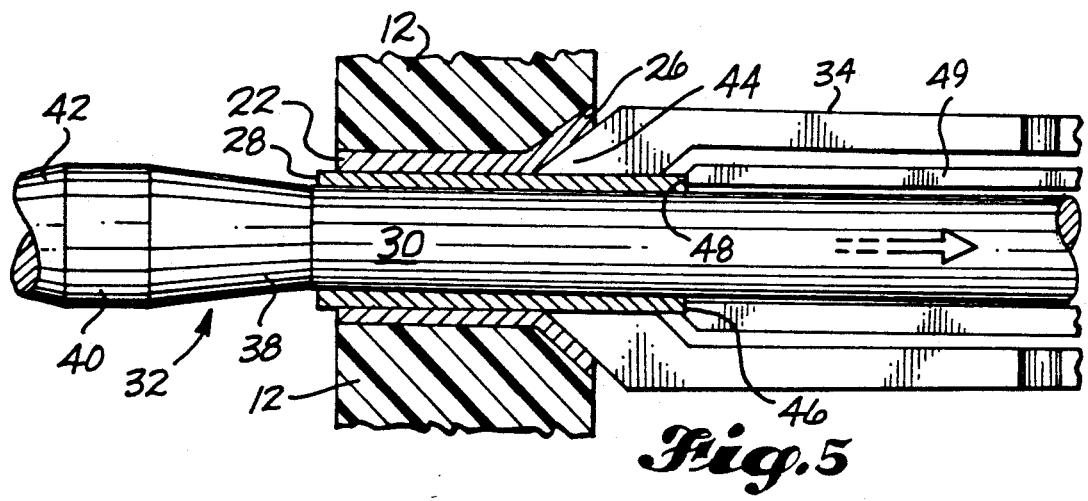
FIG. 5 is the first of three similar longitudinal sectional views illustrating the sequence of the grommet setting method according to the invention, such view showing a split sleeve on a small diameter portion of a mandrel, a grommet positioned within a grommet-receiving hole in the wall of composite material, the mandrel and the split sleeve positioned within the grommet, and a nosepiece portion of a power puller positioned against the wall and ends of the grommet and split sleeve.
Figure 6:
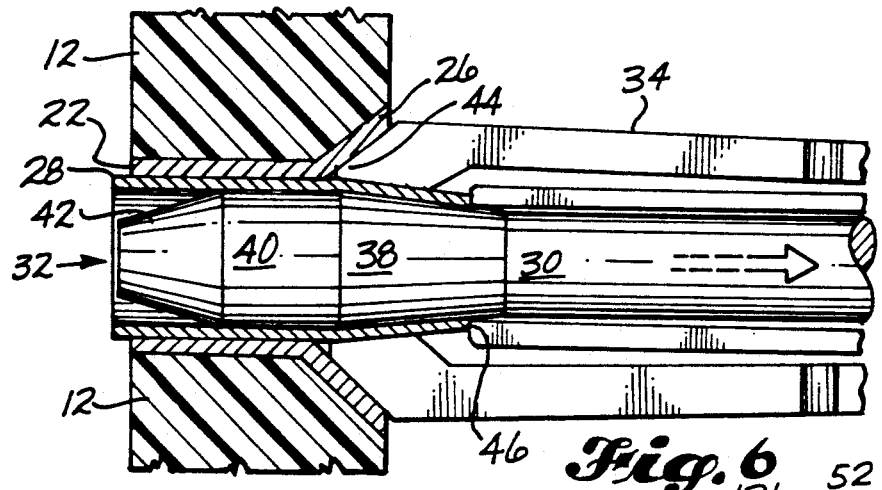
FIG. 6 is a view similar to FIG. 5, illustrating the retraction of the mandrel by the power puller, and showing the increasing diameter portion and maximum diameter portion of the mandrel expanding the split sleeve and the split sleeve in turn expanding the grommet.

Referring to FIGS. 1 and 2, the basic steps of the invention are as follows: A cylindrical hole or opening 10 is drilled through a wall 12 of composite material where it is desired to have a grommet. Care is taken to drill a clean hole having a smooth side wall 14. As is known to those skilled in the art, a "composite" material comprises a plurality of layers of a structural fabric within a resin matrix. The fabric is made up of woven strong fibers 16. The drilling of an opening 10 through this material exposes the ends 18 of the fibers 16 at the side wall boundary of the hole (FIG. 4).

The opening 10 is formed by drilling using drills and drill bits which are known for drilling through composite material. Following drilling of the cylindrical hole 10, a countersink 20 is preferably formed at one end of the hole 10. A drill bit having a countersink drilling portion at its base end may be used for forming first the hole and then the countersink 20 at the end of the hole 10 by a single drilling action.

Next, a grommet 22 is hand set into the hole. The grommet 22 is meal (preferably stainless steel) and it has a cylindrical main portion 24 and a flared end portion 26. The main portion 24 is sized to snugly fit within the cylindrical hole 10. The flared end portion 26 is sized to snugly fit within the countersink 20. When a hole 10 without a countersink 20 is used, alternative grommet shapes may be used. Herein the term "hand set" means that a hand force is used for pushing the grommet 22 into the hole 10 and countersink 20. Of course, the workman may apply the hand force against a handheld tool which is moved against the flared end 26 of the grommet 22.

Next, according to the invention, a split sleeve 28 is placed onto a small diameter portion 30 of a mandrel 32. The base end of the mandrel extends through a nosepiece portion 34 of a power puller 36 and is connected to a piston inside of the power puller 36. The power puller 36, the mandrel 32 and the split sleeve 28 may be as disclosed in the aforementioned U.S. Pat. No 4,471,643, and the other Champoux patents referred to in that patent. For this reason, the entire puller 36 is not illustrated and described herein, but rather, reference is made to U.S. Pat. No. 4,471,643 and to the other Champoux patents for a description of the constructional details of the power puller 36.

After the split sleeve 28 is placed on the mandrel 32 the sleeve 28 and mandrel 32 are inserted through the grommet 22 from the flared end 26 of the grommet 22. The mandrel 32 has an increasing diameter portion 38 extending endwise outwardly from the small diameter portion 30 to a maximum diameter portion 40. It also includes a leading end portion 42 which converges as it extends endwise outwardly from the maximum diameter portion 40. The converging end portion 42 serves to "pilot" the mandrel 32 into the grommet 22. The maximum diameter portion 40 of mandrel 32 has a diameter which is slightly smaller than the inside diameter of the grommet 22. When the split sleeve 28 is on the small diameter portion 30 of the mandrel 32, it has an outside diameter which is also smaller than the inside diameter of the grommet 22. This construction and arrangement permit performing the work to set the grommet 22 from a single side of the composite wall 12.

The leading end portion 42 of the mandrel 32 is aligned with the grommet 22 and then the mandrel 32 and sleeve 28 are moved into and through the interior of the grommet 22 until the end portion 44 of the nosepiece 34 is against the wall 12. When the end portion 44 of the nosepiece 34 contacts the wall 12, it also contacts the flared end 26 of the grommet 22 and the confronting end 46 of the split sleeve 28. The outer end portion of the nosepiece 34 includes an annular space 47 about the mandrel 32 into which the inner end portion of the split sleeve 28 is received. The end 46 of the split sleeve 28 is in contact with the end surface 48 of a sleeve retainer 49 within the nosepiece 34. This contact is maintained throughout expansion of the split sleeve 28 and grommet 22.

Figure 7:
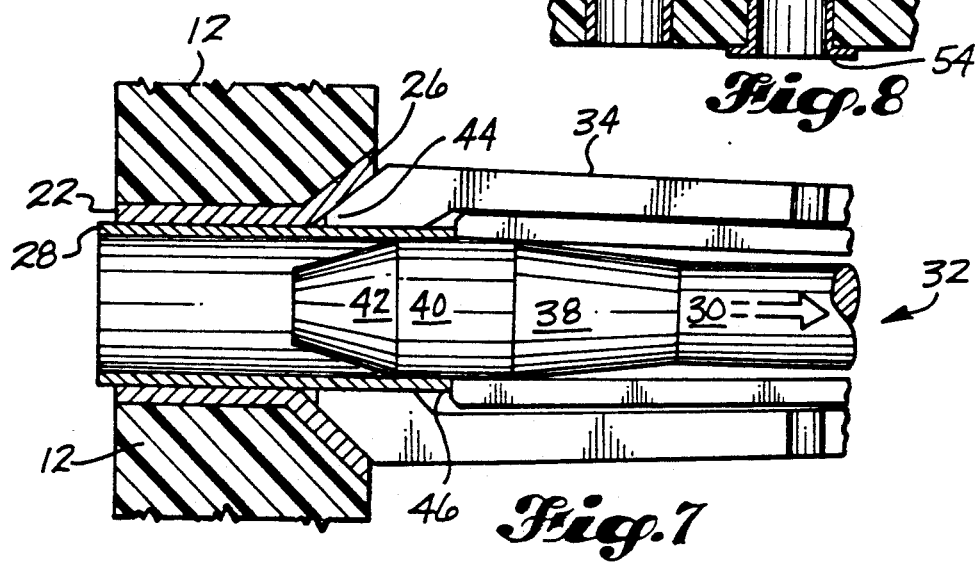
FIG. 7 is a view similar to FIGS. 4 and 5, illustrating a further retraction of the mandrel and showing the increasing diameter portion and the maximum diameter portion of the mandrel having completed the radial expansion of the split sleeve and the grommet.

The end portion 44 of the nosepiece 34 is against the wall 12 and the flared end 26 of the grommet 22. The end 46 of the split sleeve 28 is against the end 48 of retainer 49, as described above. Then the operator activates the power puller 36 to pull the mandrel 32 rearwardly into the power puller 36. As the mandrel 32 moves into the power puller 36, the increasing diameter portion 38 of the mandrel 32 enters into the split sleeve 28 and causes the split sleeve 28 to increase in diameter. Eventually, the maximum diameter portion 40 of the mandrel 32 is within the split sleeve 28 and is moved by further retraction of the mandrel 32 through the full length of the split sleeve 28. When the maximum diameter portion 40 of the mandrel 32 is within the split sleeve 28 (FIG. 7), the split sleeve 28 is expanded so as to have an outside diameter that is greater than the inside diameter of the grommet 22. Accordingly, radial expansion of the split sleeve 28 applies a radial outwardly-directed force on the grommet 22, causing its expansion without an axial force being transferred to the grommet.

As explained in the aforementioned U.S. Pat. No. 3,566,662, the inner surface of the split sleeve 28 is lubricated to facilitate movement of the mandrel 32 through the split sleeve 28. Also, as described in the aforementioned U.S. Pat. No. 4,471,643, the nosepiece 34 is expandable so that the increasing diameter portion 38 and the maximum diameter portion 40 of the mandrel 32 can be moved into the nosepiece 34.

According to the invention, the amount of radial expansion of the grommet, and the rate of expansion, are controlled so that the grommet 22 will expand without crushing and weakening the zone of composite material 46 immediately surrounding the grommet 22. It was found that when the grommet 22 was expanded in this manner, the end portions 18 of the fibers 16 in the composite material actually penetrated into the outer surface portion of the grommet 22, without crushing or weakening the composite material 12 where it immediately surrounds the grommet 22. This is shown in FIG. 4.

Following a complete retraction of the mandrel 32 through the split sleeve 28, the mandrel 32 is removed from the split sleeve 28 and it and the power puller 36 are moved away from the wall 12. Then, the split sleeve 28 is removed from the grommet 22. This is easy to do because after the maximum diameter portion 40 of the mandrel 32 has passed through the split sleeve 28, the split sleeve 28 contracts in diameter to where it can easily be removed from the grommet 22.

It was found that by use of this method, the grommet 22 was secured in place within the composite wall 12 and could not be removed unless forced out be a substantial pushing force, e.g. 800 lb. force applied to the nonflared end of the grommet 22. Installation of the grommet 22 in the manner described is done quickly and easily without damage to the composite material 12 and results in a sure securement of the grommet 22 within its opening 10.

Figure 8:
FIG. 8 is a reduced scale fragmentary sectional view of a composite wall and a straight grommet and a T-grommet installed in the wall.

FIG. 8 shows a straight grommet 50 and a T-grommet 52 installed in a composite wall 12'. A T-grommet 52 made of stainless steel provides an inert barrier in the form of its washer-like end 54 which may function to separate the composite from corrosion-prone metallics. End 54 insulates the joint between composite and metallic structure to prevent galvanic corrosion.

In summary, in preferred form, the method of this invention provides for single-sided installation of thin-walled grommets. Excellent grommet retention is achieved without bonding. This allows removal and reinstallation of fasteners in the composite material. The method provides for an insulated attachment of the composite material to metallic structures. The service life of the fastened composite joint is increased. The method provides potential for good electrical bonding. Expansion of the grommet ensures elimination of air gaps. The fit of the grommet ensures good electrical bonding between composite and metallic structures.

The embodiment which has been illustrated and described is presented to provide a basis for a better understanding of the invention. The invention is not to be limited by this embodiment but rather is to be determined by an interpretation of the following claims, using the established rules of claim interpretation, including the doctrine of equivalents.

What is claimed is:

1. A method of installing a metal grommet in a wall of a composite material composed of fibers and a resin matrix, comprising:

forming a cylindrical opening in said wall, to create a grommet receiving opening cutting across the fibers, said opening having a side wall;

providing a tubular metal grommet with an outside diameter sized to closely fit within said opening;

inserting said grommet into said opening;

providing a mandrel of a type having in series a small diameter portion, an increasing diameter portion, and a maximum diameter portion;

positioning an internally lubricated, one-piece split sleeve on said small diameter portion of the mandrel;

inserting the mandrel and split sleeve into the grommet;

holding both the split sleeve and grommet in a fixed axial position within said opening while moving the mandrel axially through the split sleeve, to move first the increasing diameter portion and then the maximum diameter portion of the mandrel axially through the split sleeve, thereby expanding the split sleeve radially and imposing a radially outwardly directed force on the grommet to expand the grommet within said opening;

wherein the mandrel and the split sleeve are so sized that the radial expansion of the split sleeve exerts sufficient radial forces on the grommet to plastically expand the grommet and place the side wall of said opening into tight gripping contact with the grommet without any significant crushing of the composite material bordering the opening; and removing the split sleeve from the grommet after the mandrel has expanded the split sleeve and the grommet.

2. The method according to claim 1, including using hand force to insert the grommet into the opening.

3. The method according to claim 1, comprising moving the mandrel through the split sleeve by pulling the mandrel.

4. The method according to claim 3, comprising pulling the mandrel by use of a power puller having a nosepiece and positioning the nose piece against the wall, the split sleeve and the grommet while pulling the mandrel through the split sleeve.

5. The method according to claim 1, comprising controlling the radial expansion of the grommet so that the ends of the fibers penetrate the grommet.

6. The method according to claim 5, comprising moving the mandrel through the split sleeve by pulling the mandrel.

7. The method according to claim 6, comprising pulling the mandrel by use of a power puller having a nosepiece and positioning the nose piece against the wall, the split sleeve and the grommet while pulling the mandrel through the split sleeve.

8. The method according to claim 7, comprising forming a countersink in said wall, at one end of the cylindrical opening, and inserting into the opening a grommet having a flared end portion matching the countersink, and moving said end portion into the countersink.

9. The method according to claim 1, comprising using a mandrel having a maximum diameter portion that is less than the inside diameter of the grommet and a split sleeve which when on the small diameter of the grommet has an outside diameter less than the inside diameter of the grommet, so that the mandrel with the split sleeve in place on the small diameter portion can be inserted through the grommet from one side of the wall.

10. The method according to claim 9, comprising controlling the radial expansion of the grommet so that the ends of the fibers penetrate the grommet.

11. The method according to claim 10, comprising moving the mandrel through the split sleeve by pulling the mandrel.

12. The method according to claim 11, comprising pulling the mandrel by use of a power puller having a nosepiece and positioning the nose piece against the wall, the split sleeve and the grommet while pulling the mandrel through the split sleeve.

13. The method according to claim 1, comprising forming a countersink in said wall, at one end of the cylindrical opening, and inserting into the opening and the countersink a grommet having a flared end portion matching the countersink, and moving said end portion into the countersink.

14. The method according to claim 13, comprising moving the mandrel through the split sleeve by pulling the mandrel.

15. The method according to claim 13, comprising pulling the mandrel by use of a power puller having a nosepiece and positioning the nose piece against the wall, the split sleeve and the flared end of the grommet while pulling the mandrel through the split sleeve.

16. The method according to claim 15, comprising using a nosepiece which has a tapered outer end and inserting said tapered outer end into the flared end portion of the grommet.

17. A method of installing a metal grommet in a wall of a composite material composed of fibers and a resin matrix, comprising:

forming a cylindrical opening in said wall, to create a grommet receiving opening cutting across the fibers, said opening having a sidewall;

forming a countersink in said wall, at one end of the cylindrical opening;

providing a tubular grommet having a cylindrical end portion insertable into said cylindrical opening and an opposite flared end portion matching the countersink;

positioning the cylindrical end portion of the grommet into the cylindrical opening and the flared end portion of the grommet into the countersink;

providing a mandrel of a type having in series a connector end portion, a small diameter portion, an increasing diameter portion, and a maximum diameter portion;

providing a puller tool having a nose piece with a tapered end sized and shaped to fit within the flared end portion of the grommet and a sleeve holder within the nosepiece;

providing an internally lubricated, one-piece split sleeve;

positioning the split sleeve on the small diameter portion of the mandrel;

inserting the mandrel and split sleeve into the grommet;

securing the connector end portion of the mandrel to the puller tool;

moving the puller tool to insert the mandrel and split sleeve into the grommet and the nose piece within the flared end portion of the grommet;

using the sleeve holder to hold the sleeve, and the nosepiece to hold the grommet, each in a fixed axial position within said opening;

operating the puller tool to pull the mandrel axially through the split sleeve, to move first the increasing diameter portion and then the maximum diameter portion of the mandrel axially through the split sleeve, thereby expanding the split sleeve radially and imposing a radially outwardly directed force on the grommet to expand the grommet within said opening;

wherein the mandrel and the split sleeve are so sized that the radial expansion of the split sleeve exerts sufficient radial forces on the grommet to plastically expand the grommet and place the sidewall of said opening into tight gripping contact with the grommet without any significant crushing of the composite material bordering the opening; and removing the split sleeve from the grommet after the mandrel has expanded the split sleeve and the grommet.

* * * * *